(12) United States Patent
Woodson

(10) Patent No.: US 7,283,632 B2
(45) Date of Patent: Oct. 16, 2007

(54) UNAUTHORIZED ACCESS EMBEDDED SOFTWARE PROTECTION SYSTEM

(75) Inventor: Alan Dennis Woodson, Mission Viejo, CA (US)

(73) Assignee: The Boeing Company, Chicago, IL (US)

(*) Notice: Subject to any disclaimer, the term of this patent is extended or adjusted under 35 U.S.C. 154(b) by 711 days.

(21) Appl. No.: 10/658,159

(22) Filed: Sep. 9, 2003

(65) Prior Publication Data

US 2005/0055571 A1 Mar. 10, 2005

(51) Int. Cl.
*H04L 9/00* (2006.01)
*H04L 9/32* (2006.01)

(52) U.S. Cl. .................. 380/262; 380/44; 713/189; 713/192

(58) Field of Classification Search ................ 380/262, 380/277, 44, 46; 713/182, 184–185, 189, 713/192; 726/27
See application file for complete search history.

(56) References Cited

U.S. PATENT DOCUMENTS 5,120,939 A * 6/1992 Claus et al. ................. 235/382
6,463,538 B1 10/2002 Elteto

* cited by examiner

*Primary Examiner*—Hosuk Song
(74) *Attorney, Agent, or Firm*—Ostrager Chong Flaherty & Broitman

(57) ABSTRACT

An operational system (10) includes a seed-bearing device (12) that has a seed (22). A key-determinative device (14) determines a key in response to the seed (22). A code-determinative device determines the code in response to the key. A controller performs a task in response to the code.

21 Claims, 3 Drawing Sheets

UNAUTHORIZED ACCESS EMBEDDED SOFTWARE PROTECTION SYSTEM

TECHNICAL FIELD

The present invention relates generally to software protection against unauthorized access. More particularly, the present invention relates to an improved system and method of preventing access to embedded software or code within an operational system.

BACKGROUND OF THE INVENTION

The field of software protection is developing rapidly and there are presently a variety of techniques used to protect software from unauthorized access. The need for software protection arises for several reasons. These reasons vary and can depend upon whether the protection is used in a military or civilian setting.

In a military setting software protection may be used to prevent access to a deployable device, such as a weapon or missile, or other fielded equipment having sensitive or classified information. Software protection is used to prevent or slow a persistent and knowledgeable intruder from gaining access to the information. The software protection may be intrusion detection protected such that upon detection of an intruder the software is erased or becomes encrypted. The software may also have various encrypted or embedded codes that are used to prevent access to the protected information.

In a civilian setting software protection may be used to prevent access to proprietary code or computer systems. Some individuals may attempt to use the code or information contained within the computer systems without proper licensing and to gain unauthorized access to the protected equipment. In civilian applications, software protection may be in various forms, such as software security modules, protective layer codes, encrypted codes, and protection tool routines.

It is desirable in both military and civilian applications to prevent access to smart devices. Smart devices generally refer to devices that have logic for performing various decisions, calculations, computational functions, or other similar tasks. For example, a deployable device, that has embedded software for protection against unauthorized access, is considered a smart device. The deployable device contains devices, that may be hardware or software based, which are used in a logical manner to prevent access to the protected software.

For military and civilian applications, classified software residing within an operational system, which may include smart devices and other fielded equipment, needs to be protected from unauthorized access. This is especially true when a smart device of the operational system comes into control by an unauthorized intruder. For example, when an intruder has unlimited access to an undamaged smart weapon or other intelligent fielded equipment, the intruder may be able to defeat active anti-tamper software protection contained within a computer system of that weapon. The intruder may defeat the software protection by disabling write signals, to prevent software erasure, or by removing memory contained within the smart weapon, for external examination. Defeat of the software protection may allow an intruder to undesirably use the weapon or gain knowledge of contents therein.

Thus, there exists a need for an improved method of preventing access to software within an operational system by an unauthorized intruder.

SUMMARY OF THE INVENTION

The present invention provides an operational system. The operational system includes a seed-bearing device that has a seed. A key-determinative device determines a key in response to the seed. A code-determinative device determines the code in response to the key. A controller performs a task in response to the code.

The embodiments of the present invention provide several advantages. One such advantage that is provided by an embodiment of the present invention is the provision of an operational system having a seed in a first device and a key-determining algorithm in a second device. Software within the operational system is inaccessible without both the first device and the second device.

Another advantage that is provided by an embodiment of the present invention is the provision of having multiple layers of protection in multiple devices. Thus, the stated embodiment increases difficulty in acquiring access to, decoding information contained within, and operating devices of an operational system without having access to each device within that operational system.

Furthermore, another embodiment of the present invention provides an operational system that does not store a decryption key, further increasing difficulty in access to the system.

Moreover, yet another embodiment of the present invention provides an operational system whereby a seed and identification of the location of that seed are in different devices of the system, further preventing access to the system.

Additionally, the present invention is simple and inexpensive to incorporate in various operational systems.

The present invention itself, together with attendant advantages, will be best understood by reference to the following detailed description, taken in conjunction with the accompanying figures.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to a system and method of preventing access to embedded software or code within an operational system, the present invention is capable of being adapted to various applications and may be applied to serve various purposes. The present invention may be applied in both military and civilian applications. The present invention may be applied to deployable devices, non-deployable devices, and to other fielded devices having limited or restricted access. The present invention may be applied to various aeronautical, naval, automotive, and computer systems, as well as to other systems known in the art requiring software protection or access prevention to the devices of an operational system.

In the following description, various operating parameters and components are described for one constructed embodiment. These specific parameters and components are included as examples and are not meant to be limiting.

Also, in the following description the term "task" may refer to any action performed by an operational system device. A task may be performed by a smart device, supporting equipment for that smart device, fielded equipment, or by any other operational system device.

Additionally, in the following description the term "supporting equipment" refers to equipment used in conjunction with a particular device for deployment of or to allow task performance within that device. For example, supporting equipment for a deployable device may be in the form of a launcher, which is used to deploy the device.

As well, in the following description the term "fielded equipment" refers to any equipment that is utilized in an operational system that is remotely located from a home or secure base. For example, a deployable device, a computer system, or a vehicle, when utilized in a foreign territory are considered to be fielded equipment.

Figure 1:
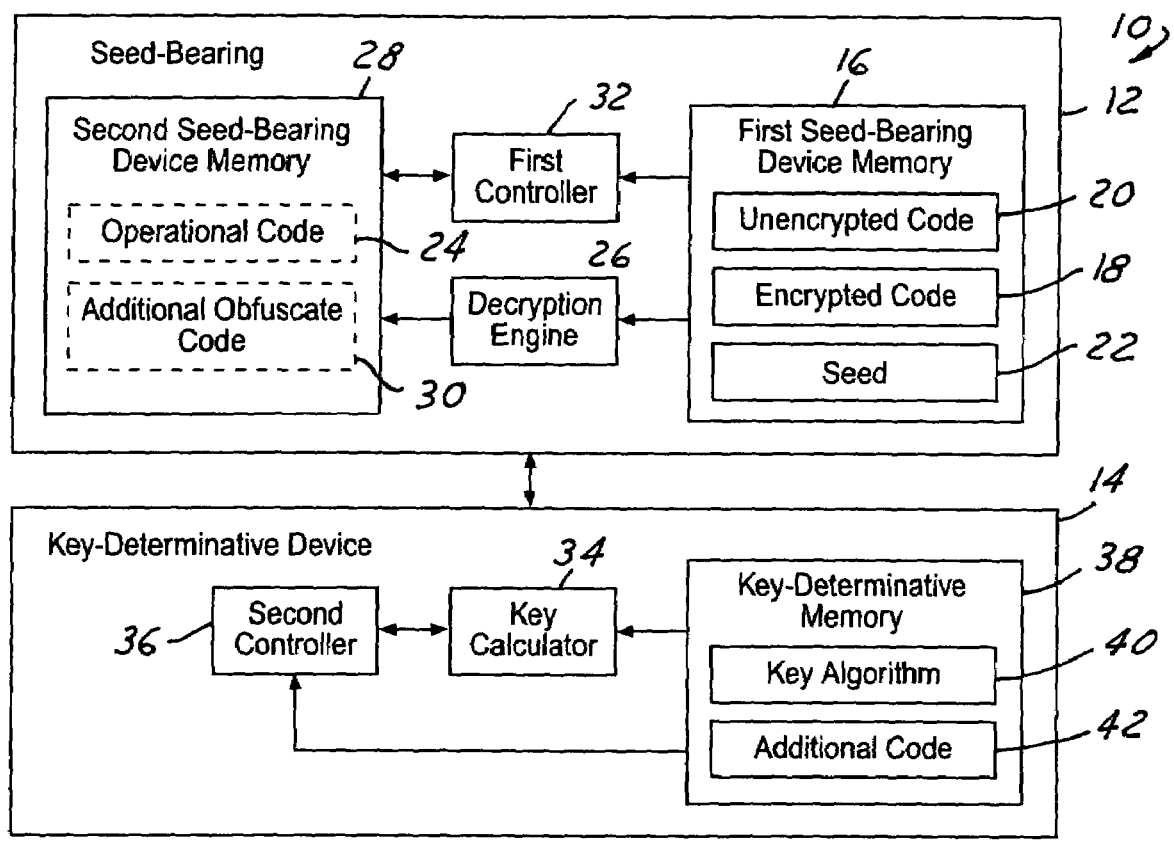
FIG. 1 is a block diagrammatic view of an operational system in accordance with an embodiment of the present invention.
Figure 2:
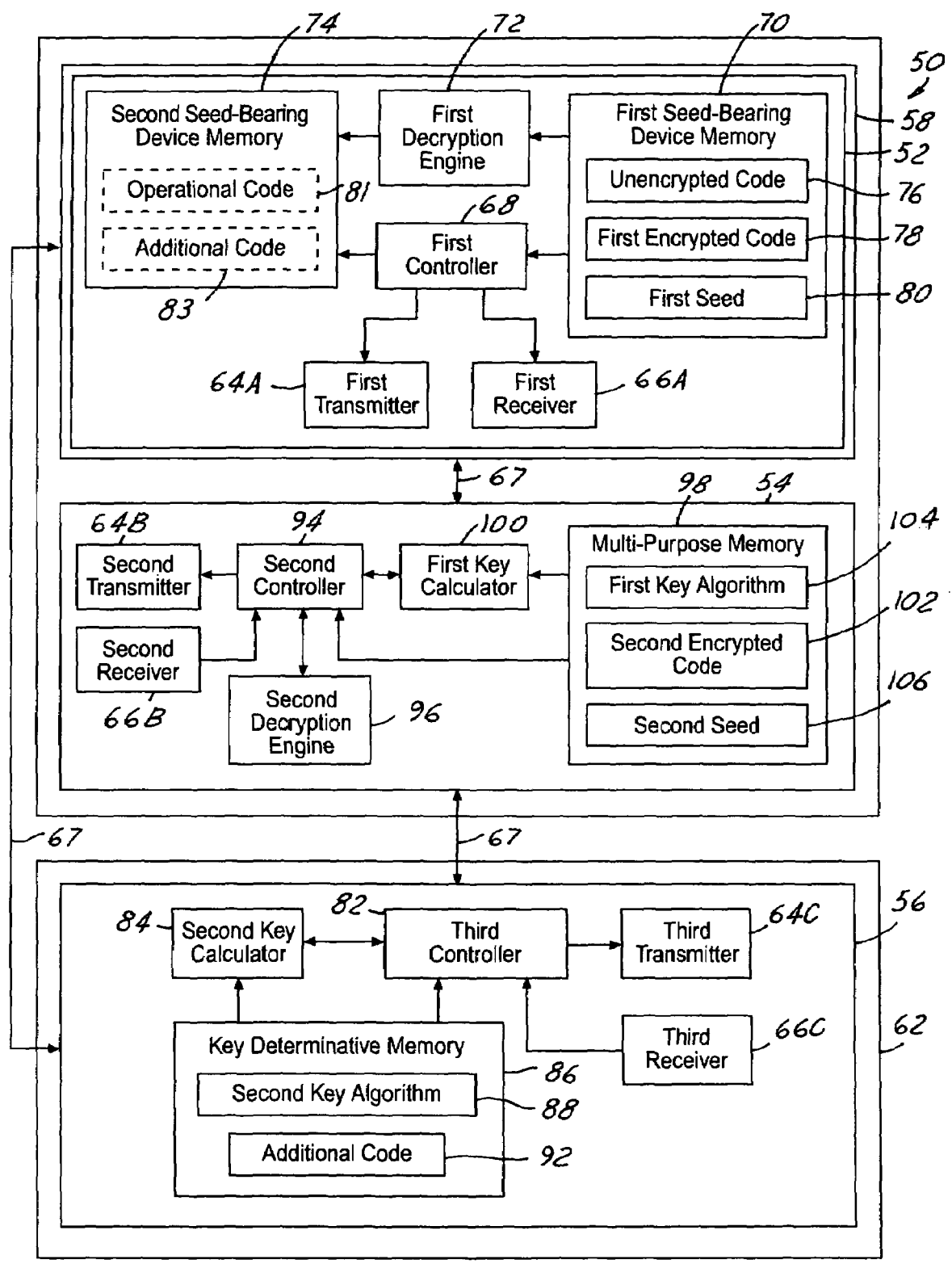
FIG. 2 is a perspective and block diagrammatic view of another operational system in accordance with an embodiment of the present invention.

Although the present invention may be applied to various operational systems and devices, for simplicity the embodiments of FIGS. 1 and 2 are primarily described with respect to a deployable device and corresponding equipment, such as a launcher of the deployable device.

Referring now to FIG. 1, a block diagrammatic view of an operational system 10 in accordance with an embodiment of the present invention is shown. The operational system 10 includes one or more seed-bearing devices 12 (only one is shown) and one or more key-determinative devices 14 (only one is shown).

The seed-bearing device 12 includes a first seed-bearing memory 16 having both encrypted code 18 and unencrypted code 20. The encrypted code 18 contains encrypted operational code 24 that is utilized in the execution of a mission. For example, when the seed-bearing device 12 is in the form of a deployable device the operational code 24 is utilized to enable deployment of the device 12. The unencrypted code 20 is used for incoming and outgoing communication. The unencrypted code 20 may be utilized to monitor "peeks" and "pokes", or to perform various other tasks known in the art. A peek refers to the acquisition of data from a device and a poke refers to the transfer of data to a device, this will become more evident in light of the following description.

The first memory 16 also includes one or more seeds 22 (only one is shown), which contain randomly preselected data. The random data is determined when the operational code 24 is encrypted to form the encrypted code 18. The first memory 16 may be in the form of read access memory (RAM), read only memory (ROM), programmable read only memory (PROM), or other type of memory known in the art. In one embodiment of the present invention, the first memory 16 is in the form of PROM. The encrypted code 18 may be stored in the first memory 16 during production of the seed-bearing device 12.

The seed-bearing device 12 also includes a decryption engine 26 and a second seed-bearing device memory 28. The decryption engine 26 is utilized to decrypt the encrypted code 18. The decryption engine 26 upon receiving a decryption key from the key-determinative device 14 decrypts the encrypted code 18 to form the operational code 24.

The second memory 28 stores the operational code 24. The second memory 28 may also be in the form of RAM, ROM, PROM, or other type of memory. In an example embodiment, the second memory 28 is in the form of RAM such that when power is removed from the seed-bearing device 12 contents of the second memory 28 is erased.

A first controller 32 is coupled to the first memory 16, the decryption engine 26, and the second memory 28. The first controller 32 controls operation of the seed-bearing device 12. The first controller 32 may control external access to the first memory 16, when the decryption engine 26 decrypts the encrypted code 18, and transfer of the encrypted code 18 to the second memory 28. The controller 32 may contain the decryption engine 26 or may be a separate device as shown.

The first controller 32 may be microprocessor based such as a computer having a central processing unit, memory, and associated input and output buses. The controller 32 may be an application-specific integrated circuit or may be formed of other logic devices known in the art. The controller 32 may be a portion of a central or main control unit or may be a stand-alone controller as shown.

The key-determinative device 14 includes a key calculator 34 and a second controller 36. The key calculator 34 determines the decrypted key using the seed 22 and a key algorithm 40, which is stored in a key-determinative device memory 38. The key calculator 34 inputs the seed 22 into the algorithm 40 and calculates the decryption key. The key calculator 34 may be part of or separate from the controller 36 as shown. The second controller 36 controls operation of the key-determinative device 14.

The key-determinative memory 38 may contain additional code 42, such as seeds, verification codes, or other codes that are used in the access and operation of the operational system 10. The key-determinative memory 38 may also be of various forms, as the memories 16 and 28. In an embodiment of the present invention, the key-determinative memory 38 is in the form of PROM.

The second controller 36 may also be microprocessor based and have a central processing unit, memory, and associated input and output buses. The controller 36 may be an application-specific integrated circuit or may be formed of other logic devices. The controller 36 may be a portion of a central or main control unit or may be a stand-alone controller as shown.

Although a single seed-bearing device and a single key-determinative device are described above, any number of each may be utilized. Any operational system device may be configured to be both a seed-bearing device and a key-determinative device. The seed-bearing devices and the key-determinative devices may be in various locations and be part of various devices including, weapons, supporting equipment, fielded equipment, and other devices and equipment known in the art. The seed-bearing devices and the key-determinative devices may be located within aeronautical vehicles, nautical vehicles, ground-based vehicles, ground based stations, and other vehicles, stations, or remote sites known in the art. Another possible example of an operational system is described with respect to the embodiment of FIG. 2.

Referring now to FIG. 2, a perspective and block diagrammatic view of another operational system 50 in accordance with an embodiment of the present invention is shown. The operational system 50 includes a first device or seed-bearing device 52, a second device or multi-purpose device 54, and a third device or key-determinative device 56. The first seed-bearing device 52 is similar to the seed-bearing device 12 and is located within a deployable device 58 of an aircraft 60. The multi-purpose device 54 has capabilities similar to both the seed-bearing device 12 and the key-determinative device 14 and is located within the aircraft 60 and may be part of a launcher of the deployable device 58. The key-determinative device 56 is located in a ground-based station 62.

The devices 52, 54, and 56 include transmitters 64A-C and receivers 66A-C, respectively, for communication therebetween. The transmitters 64 and receivers 66 may be of various types and styles known in the art. The communication between the devices 52, 54, and 56 is represented by arrows 67. The communication may include various peeks, pokes, and other communication signals known in the art.

The seed-bearing device 52 includes a first controller 68, a first seed-bearing device memory 70, a first decryption engine 72, and a second seed-bearing device memory 74. The first memory 70 stores unencrypted code 76, a first set of encrypted code 78, and a first seed 80. The first seed 80 is stored at a first predetermined address in the first memory 70. The second memory 74, like the second memory 28, stores operational code 81 and may also store additional code 83.

The multipurpose device 54 includes a second controller 94, a second decryption engine 96, a multipurpose memory 98, and a first key calculator 100. The multipurpose memory 98 stores a second set of encrypted code 102, a first key algorithm 104, and a second seed 106. The second seed 106 is stored at a predetermined address in the multipurpose memory 98.

The key-determinative device 56 includes a third controller 82, a second key calculator 84, and a key-determinative memory 86. The key-determinative memory 86 stores a second key algorithm 88. The multipurpose memory 86 may also store additional code 92.

The memories 70, 74, 86, and 98, decryption engines 72 and 96, and key calculators 84 and 100 are similar to the memories 16, 28, and 38, decryption engine 26, and key calculator 34, respectively, of the embodiment of FIG. 1.

Figure 3:
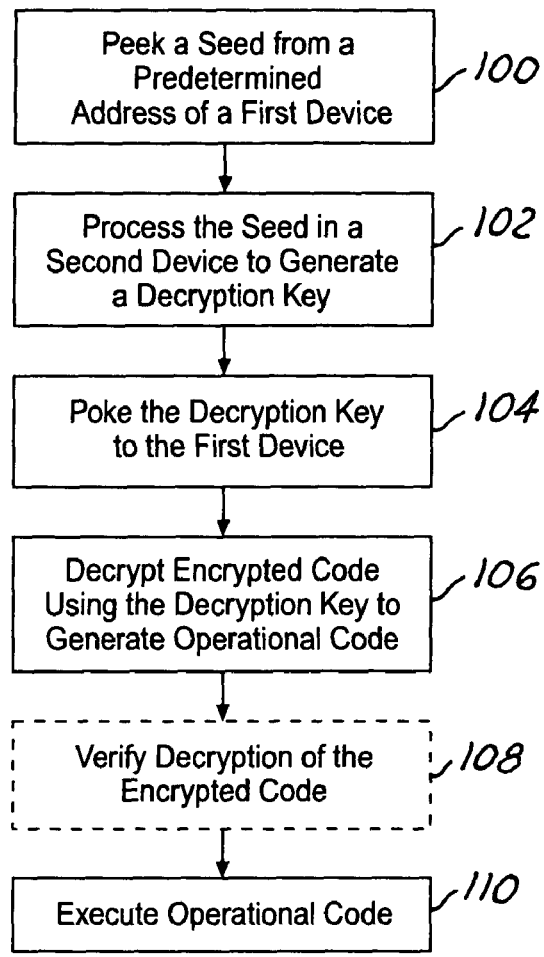
FIG. 3 is a logic flow diagram illustrating a method of preventing access to the code within the operational system of FIG. 1 in accordance with an embodiment of the present invention.

Referring now to FIG. 3, a logic flow diagram illustrating a method of preventing access to the code within the operational system 10 in accordance with an embodiment of the present invention is shown. Although the method of FIG. 3 is described with respect to the embodiment of FIG. 1, it may be easily modified to apply to other embodiments of the present invention.

In step 100, the second controller 36 peeks the seed 22 from a predetermined address of the first device or the seed-bearing device 12. The predetermined address may be a memory address of the first memory 16. The first controller 32 may receive an address identification and request from the second controller 36 and allow access to that address by the second controller 36. Although the seed 22 is stored in the first memory 16, the first controller 32 does not store identification of the address of the seed 22 and does not have capability of determining the location of the seed 22. The first controller 32 receives such identification from the key-determinative device 14.

In step 102, the seed 22 is processed in the second device or key-determinative device 14. The second controller 36 processes the seed 22 using the key calculator 34. The key calculator 34 determines a decryption key in response to the seed 22. The seed 22 is entered into the key algorithm 36 to generate the decryption key. The seed 22 and the decryption key may be in the form of code, words, random data, or in some other form known in the art.

In step 104, the second controller 36 or the key calculator 34 pokes the decryption key into the decryption engine 26. The first controller 32 may control access to the decryption engine 26.

In step 106, the decryption engine 26 decrypts the encrypted code 18, in response to reception of the decryption key, to generate the operational code 24. After decryption the operational code is stored in the second memory 28. Upon initialization of the system 10 the operational code is not stored in the second memory 28. Although the seed-bearing device 12 contains the decryption engine 26, which is used as a code determinative device, the decryption engine 26 may be part of the key-determinative device 14, part of a controller, or part of some other device known in the art.

In step 108, the first controller 32, the second controller 36, or a combination thereof may verify that the encrypted code 18 has successfully and correctly been decrypted. For example, upon decryption of the encrypted code 18 the second controller 36 may receive a verification word from the first controller 32. The second controller 36 may compare the verification word to a predetermined word stored in the key-determinative memory 38 and generate a verification signal. The first controller 32 may proceed to step 110 in response to the verification signal. When the verification signal is in a "Positive" state, thereby indicating that the decryption was successful and correct, the first controller 32 proceeds to step 110.

In step 110, the first controller 32 executes the operational code 24 from the second memory 28. The execution of the operational code 24 enables the operational system 10 to perform various tasks. When the seed-bearing device 12 is a deployable device the first controller 32 may then deploy the seed-bearing device 12 in response to the operational code.

Figure 4:
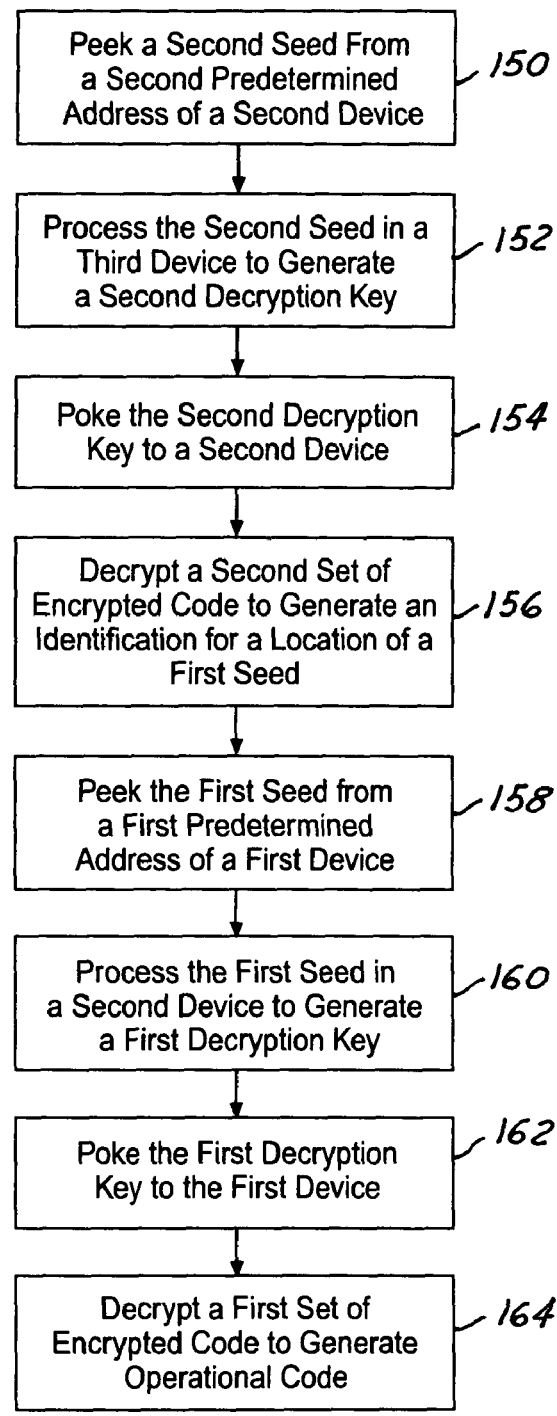
FIG. 4 is a logic flow diagram illustrating a method of preventing access to the code within the operational system of FIG. 2 in accordance with an embodiment of the present invention.

Referring now to FIG. 4, a logic flow diagram illustrating a method of preventing access to the code within the operational system 50 in accordance with an embodiment of the present invention is shown. Although the method of FIG. 4 is described with respect to the embodiment of FIG. 2, it may be easily modified to apply to other embodiments of the present invention.

In step 150, the third controller 82 peeks the second seed 106 from a predetermined address of the multipurpose device 54. The second controller 94 may receive an address identification from the third controller 82 and allow access to that address by the third controller 82.

In step 152, the second controller 82 processes the second seed 106 using the second key calculator 84. The second key calculator 84 determines a second decryption key in response to the second seed 106. The second seed 106 is entered into the second key algorithm 88 to generate the second decryption key.

In step 154, the third controller 82 or the second key calculator 84 pokes the second decryption key into the second decryption engine 96. The second controller 94 may control access to the second decryption engine 96.

In step 156, the second decryption engine 96 decrypts the second set of encrypted code 102 in response to reception of the second decryption key to generate an identification as to location of the first seed 80. The identification may, for example, be an address of a memory location, such as a first predetermined address of the first seed-bearing device memory 70.

In step 158, the second controller 94 peeks the first seed 80 from the identified location, as determined in step 156, of the seed-bearing device 52. The second controller 94 may request the peek from the first controller 68.

In step 160, the second controller 94 using the first key calculator 100 determines the first decryption key. The first key calculator 100 enters the first seed 80 into the first key algorithm 104 to calculate the first decryption key.

In step 162, the second controller 94 pokes the first decryption key into the first decryption engine 72. In step 164, the first decryption engine 72 decrypts the first set of encrypted code 78 to generate the operational code 81. When the operational code 81 is generated the first controller 68 may proceed in the deployment of the deployable device 58 or may perform some other task within the seed-bearing device 52.

The above-described steps of FIGS. 3 and 4 are meant to be illustrative examples; the steps may be performed synchronously, sequentially, simultaneously, or in a different order depending upon the application. Also, although a couple of examples are shown above using a particular amount of seed-bearing devices and key-determinative devices in a particular arrangement, various other arrangements and combinations may be easily envisioned by one skilled in the art.

The present invention provides an operational system and method for preventing access to embedded software, code, or the like that is contained therein. The present invention prevents access to the code contained within an operational system by providing one or more layers of protection in multiple devices.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of preventing access to code within an operational system comprising the following steps: determining at least one decryption key in a first device in response to at least one seed contained within a second device; determining operational code for execution by said second device in response to said at least one decryption key; and enabling the second device to perform at least one task in response to said operational code.

2. A method as in claim 1 wherein the step of determining at least one decryption key comprises executing an algorithm to calculate said at least one key in response to said at least one seed.

3. A method as in claim 1 wherein the step of determining operational code comprises decrypting an encrypted operational code.

4. A method as in claim 1 further comprising the step of verifying said operational code.

5. An operational system comprising: at least one smart device having at least one seed and encrypted code; supporting equipment determining at least one decryption key in response to said at least one seed; said at least one smart device decrypting said encrypted code in response to said at least one decryption key to generate a decrypted code; and a controller performing at least one task in response to said decrypted code.

6. An operational system comprising:
a smart device comprising a first memory storing a first seed and first encrypted operational code, and a controller for causing said smart device to perform a task in accordance with the operational code only if the operational code has been decrypted;
a first key-determinative device that determines a first decryption key in response to receipt of the first seed from the smart device and as a function of the first seed; and
a first code-determinative device that decrypts the encrypted operational code in response to receipt of the first decryption key.

7. The system as in claim 6, wherein the first code-determinative device is incorporated in the smart device.

8. The system as in claim 6, wherein the first code-determinative device is incorporated in the first key-determinative device.

9. The system as in claim 6, wherein the smart device is a deployable device and the first key-determinative device is a launcher designed to launch the deployable device.

10. The system as in claim 9, wherein the operational code is used to deploy the deployable device.

11. The system as in claim 6, wherein the smart device is a computer system.

12. The system as in claim 6, wherein the first key-determinative device comprises a key algorithm for determining the first decryption key.

13. The system in claim 6 wherein the first key-determinative device verifies the operational code.

14. The system in claim 6 wherein the first key-determinative device comprises a second memory storing a key algorithm, a second controller and a key calculator that calculates the first decryption key as a function of the first seed.

15. The system as in claim 6 wherein the first seed is stored in a predetermined address in the first memory and the first key-determinative device stores an identification of the predetermined address.

16. The system as in claim 6, wherein the first seed is stored in a predetermined address in the first memory and the controller does not store an identification of the predetermined address.

17. The system as in claim 6, wherein the smart device is unable to determine the first decryption key.

18. The system as in claim 6, wherein the first seed is inaccessible to the controller of the smart device.

19. The system as in claim 6, further comprising:
a second memory storing a second seed, the second memory being incorporated in the first key-determinative device;
a second key-determinative device that determines a second decryption key in response to receipt of the second seed and as a function of the second seed; and
a second code-determinative device that determines an identification of the address in the first memory where the first seed is stored in response to receipt of the second decryption key from the second key-determinative device.

20. The system as in claim 19, wherein the second code-determinative device is incorporated in the first key-determinative device.

21. The system as in claim 19, wherein the smart device is a deployable device and the operational code is used to deploy the deployable device, the second memory and the first key-determinative device are components of a launcher for the deployable device, and the second key-determinative device is part of a ground-based station.

* * * * *